Sept. 7, 1937.   J. HALTENBERGER   2,092,507
AUTOMOBILE
Filed July 13, 1936
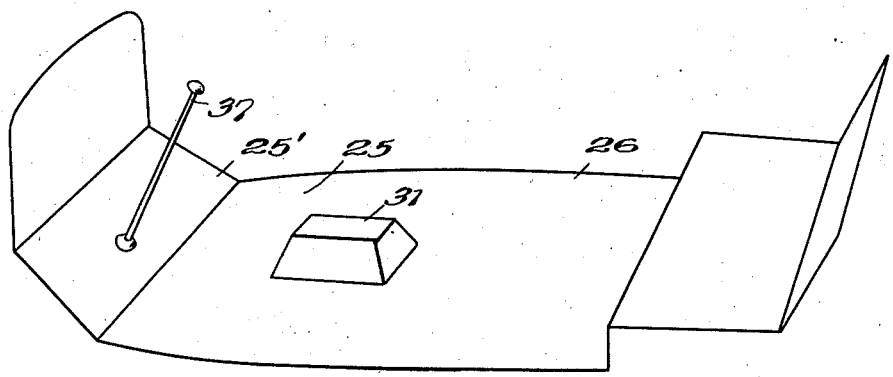
Inventor
Jules Haltenberger Patented Sept. 7, 1937

2,092,507

UNITED STATES PATENT OFFICE 2,092,507

AUTOMOBILE

Jules Haltenberger, Indianapolis, Ind.

Application July 13, 1936, Serial No. 90,361

5 Claims. (Cl. 180—54)

My invention relates to an automobile construction where a front engine and an amid-ship transmission are separated by a spacer shaft.

It is the object of my invention to provide in a front engine rear wheel drive automobile a low floor in the usual front body compartment and to permit the elimination of a floor tunnel when so desired.

Further objects of my invention will appear as the description proceeds.

The accompanying drawing illustrates my invention:

Fig. 1 is a fragmental side elevation of an automobile with parts in section, as viewed from the right side;

Fig. 2 is a fragmental side elevation of the front half of an automobile, showing a modification of the invention, as viewed from the left side;

Fig. 3 is a schematic perspective view of the floor illustrated in Figs. 1 and 2.

Referring to the construction illustrated in Figs. 1 and 3, it will be seen that between a pair of front wheels 10 (only the right wheel is shown) is an engine 11, supported in any known manner (support not shown). The rear of the engine is provided with a usual flywheel housing 12 and a usual bell housing 13 is attached thereto, containing a usual flywheel (not shown) connected to a spacer shaft 14.

The rear part of bell housing 13 is formed into a spacer 15, terminating in flange 16, arranged to support a relatively large size change-speed transmission 17, (remote control to be described).

At the rear of the transmission a shaft 18 carries a universal joint 19, connected to an exposed propeller shaft 20. At the rear of the propeller shaft a universal joint 21 is arranged to drive the usual differential in rear axle 22 and driving wheels 23 respectively (only right wheel shown).

A body front compartment 24 is provided with a floor 25, as is clear from the drawing. This floor is located directly over the spacer shaft 14 and spacer 15; however, it is positioned materially lower than the top of change-speed transmission 17. To the fore the floor is connected to toe board 25'.

Floor 25 is connected to a rear floor 26 in rear compartment 27. Between the floors and over the protruding part of transmission 17 is positioned a sound controlling dome formed of front wall 28, rear wall 29, near and far walls 30 (only far wall is shown), and lid 31. This dome is of only sufficient lateral width to cover the protruding transmission housing and change-speed operating device (to be described) to permit the use of bucket seats when desired. Over the dome is placed the frame of an adjustable front seat, indicated at 32.

As is clear from the drawing, by placing the transmission under the seat the front compartment floor can be materially (nearly 4") lowered and a tunnel can be eliminated if desired. When a tunnel is permissible the top of it will correspond to the illustration. When bolting the transmission on a spacer carried by the engine, a self aligned unit is created.

The change-speed transmission 17 is shaped and proportioned to house a planetary change-speed transmission, preferably of the automatic type.

For clearness of presentation applicant has illustrated a wood floor fully aware that many automobiles use metal floors. Such a variation, however, does not depart from the essence of the invention.

The invention has particular value when used with automatic or semi-automatic transmissions as these are much bulkier and, when positioned under the front compartment floor, raise the floor higher than the present day lever-operated transmissions, assuming the usual requisite minimum clearance under the engine and flywheel in both cases.

The invention is not limited to automatic transmissions. A lever-controlled transmission, provided with a "standard" gear-shift, may be used. This is illustrated in Fig. 2.

Here flywheel housing 12 and bell housing 13 contain the usual clutch assembly (not shown) and by spacer shaft 14 is connected to a "standard" lever-operated transmission 33 provided with a usual ball jointed shifter tower 34 and from it a "standard" change-speed lever 35 protrudes, but here it is bent outwardly and downwardly, the lever terminating in a bolted joint operatively connecting it to a rod 36. The forward end of this rod is operatively connected to the lower end of a usual change-speed lever 37 fulcrumed on toe board 25' by a usual ball joint in bracket 39.

Both levers change speeds by fore and aft rocking and both levers "select" by lateral rocking movement. The arrangement of parts as illustrated, when using a "standard" transmission, will result in a remote but standard change-speed lever operation, leaving the floor board unobstructed. At the rear of the transmission a universal joint, generally at 40, drives a propeller shaft 42 in torque-tube 43.

Fig. 3 illustrates in perspective the floor illustrated in Figs. 1 and 2 and by illustrating therein lever 37 it is more specific to Fig. 2.

The applicant claims as his invention:

1. In an automobile, an engine, a clutch, a spacer and a change-speed transmission in progression forming a unit, a body front compartment having a floor associated therewith, said floor being positioned above said spacer and below the top level of said transmission.

2. In an automobile, an engine, a flywheel, a spacer with a spacer shaft and a change-speed transmission in progression forming a unit, a body front compartment having a floor associated therewith, said floor being positioned above said spacer shaft in close proximity thereto and below the top level of said transmission.

3. In an automobile, a body, front and rear compartments, unobstructed floors therein and a connecting floor therebetween all substantially in one plane, a change-speed transmission protruding through said connecting floor and an enclosing dome over said protrusion, driving means for said transmission including a spacer shaft under said front compartment floor and an engine in front of said last mentioned floor, said engine, shaft and transmission forming a unit.

4. In an automobile, a body, front and rear compartments, unobstructed floors therein and a connecting floor therebetween all substantially in one plane, a change-speed transmission protruding through said connecting floor and an enclosing dome over said protrusion, driving means for said transmission including a spacer shaft under said compartment floor and an engine in front of said last mentioned floor, said engine, shaft and transmission forming a unit, and a remote control connection for said transmission comprising an operating connection under said floor and operating means in said front compartment.

5. In an automobile, a body, front and rear compartments, a continuous floor therein, an opening in said floor intermediate said compartments, a change-speed mechanism protruding therethrough, driving means for said transmission including a spacer shaft positioned under the forward portion of said floor and an engine at the front of said floor portion, an adjustable seat over said transmission and means on said floor housing said transmission.

JULES HALTENBERGER.